US011175832B2

(12) United States Patent
Muthukrishnan

(10) Patent No.: US 11,175,832 B2
(45) Date of Patent: Nov. 16, 2021

(54) THREAD GROUPS FOR PLUGGABLE DATABASE CONNECTION CONSOLIDATION IN NUMA ENVIRONMENT

(71) Applicant: Oracle International Corporation, Redwood Shores, CA (US)

(72) Inventor: Nagarajan Muthukrishnan, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 629 days.

(21) Appl. No.: 15/012,621

(22) Filed: Feb. 1, 2016

(65) Prior Publication Data

US 2017/0220271 A1    Aug. 3, 2017

(51) Int. Cl.
| | | |
|---|---|---|
| *G06F 9/54* | (2006.01) | |
| *G06F 3/06* | (2006.01) | |
| *G06F 16/21* | (2019.01) | |
| *G06F 16/25* | (2019.01) | |
| *G06F 16/28* | (2019.01) | |
| *G06F 16/9535* | (2019.01) | |
| *G06F 16/2455* | (2019.01) | |
| *G06F 11/14* | (2006.01) | |
| *G06F 21/62* | (2013.01) | |
| *G06F 12/084* | (2016.01) | |
| *G06F 13/16* | (2006.01) | |

(52) U.S. Cl.
CPC ............ *G06F 3/0619* (2013.01); *G06F 3/065* (2013.01); *G06F 3/067* (2013.01); *G06F 9/544* (2013.01); *G06F 11/1469* (2013.01); *G06F 11/1471* (2013.01); *G06F 12/084* (2013.01); *G06F 13/1663* (2013.01); *G06F 16/21* (2019.01); *G06F 16/211* (2019.01); *G06F 16/24552* (2019.01); *G06F 16/25* (2019.01); *G06F 16/256* (2019.01); *G06F 16/284* (2019.01); *G06F 16/9535* (2019.01); *G06F 21/6218* (2013.01); *G06F 11/1448* (2013.01); *G06F 2201/80* (2013.01); *G06F 2201/835* (2013.01); *G06F 2212/60* (2013.01); *G06F 2212/62* (2013.01)

(58) Field of Classification Search
CPC ........ G06F 16/25; G06F 16/21; G06F 16/211; G06F 16/256; G06F 3/0619; G06F 3/065; G06F 3/067; G06F 12/084; G06F 13/1663; G06F 2212/60; G06F 2212/62; G06F 9/544

See application file for complete search history.

(56) References Cited

U.S. PATENT DOCUMENTS 6,185,699 B1    2/2001  Haderle
6,205,449 B1    3/2001  Rastogi et al.
(Continued)

OTHER PUBLICATIONS

Michael, U.S. Appl. No. 14/571,008, filed Dec. 15, 2014, Final Office Action, dated Apr. 27, 2018.
(Continued)

*Primary Examiner* — Charles D Adams
(74) *Attorney, Agent, or Firm* — Hickman Becker Bingham Ledesma LLP

(57) ABSTRACT

Techniques are provided herein for assigning pluggable database connections to thread groups. The techniques involve associating pluggable databases with thread groups. Each thread group is associated with a process running on a NUMA node. When a request for a connection for a pluggable database is received, the system determines which process on which NUMA node to spawn a thread for connecting to the pluggable database.

16 Claims, 5 Drawing Sheets

(56) References Cited

U.S. PATENT DOCUMENTS

| | | |
|---|---|---|
| 6,226,650 B1 | 5/2001 | Mahajan |
| 6,295,610 B1 | 9/2001 | Ganesh |
| 6,983,295 B1 | 1/2006 | Hart |
| 7,305,421 B2 | 12/2007 | Cha |
| 7,822,717 B2 | 10/2010 | Kapoor |
| 8,117,174 B2 | 2/2012 | Shaughessey |
| 8,364,648 B1 | 1/2013 | Sim-Tang |
| 8,478,718 B1 | 7/2013 | Ranade |
| 8,554,762 B1 | 10/2013 | O'Neill |
| 8,805,849 B1 | 8/2014 | Christensen |
| 9,026,679 B1 | 5/2015 | Shmuylovich |
| 9,390,120 B1 | 7/2016 | Gulliver |
| 9,684,561 B1 | 6/2017 | Yan |
| 2002/0112022 A1 | 8/2002 | Kazar et al. |
| 2002/0143733 A1 | 10/2002 | Mukkamalla |
| 2004/0039962 A1 | 2/2004 | Ganesh |
| 2004/0054643 A1 | 3/2004 | Vermuri |
| 2004/0054644 A1 | 3/2004 | Ganesh |
| 2004/0177099 A1 | 9/2004 | Ganesh |
| 2004/0210577 A1 | 10/2004 | Kundu |
| 2005/0234936 A1* | 10/2005 | Castro ............... G06F 16/27 |
| 2005/0289213 A1* | 12/2005 | Newport ............. H04L 67/14 709/200 |
| 2006/0047713 A1 | 3/2006 | Gornshtein |
| 2006/0206489 A1* | 9/2006 | Finnie ............... G06F 9/5016 |
| 2007/0100912 A1 | 5/2007 | Pareek |
| 2007/0244918 A1 | 10/2007 | Lee |
| 2008/0208820 A1 | 8/2008 | Usey |
| 2010/0211756 A1* | 8/2010 | Kaminski ........... G06F 12/023 711/172 |
| 2011/0047555 A1 | 2/2011 | Lakshmanan |
| 2011/0060724 A1 | 3/2011 | Chan |
| 2011/0087633 A1 | 4/2011 | Kreuder et al. |
| 2011/0307450 A1 | 12/2011 | Hahn |
| 2012/0284228 A1 | 11/2012 | Ghosh |
| 2012/0284544 A1 | 11/2012 | Xian |
| 2012/0287282 A1 | 11/2012 | Kinoshita |
| 2012/0323849 A1 | 12/2012 | Garin |
| 2013/0085742 A1 | 4/2013 | Barker et al. |
| 2013/0085998 A1 | 4/2013 | Barker |
| 2013/0117237 A1 | 5/2013 | Thomsen et al. |
| 2013/0198133 A1 | 8/2013 | Lee |
| 2014/0033220 A1* | 1/2014 | Campbell ........... G06F 9/5083 718/104 |
| 2014/0095452 A1 | 4/2014 | Lee |
| 2014/0164331 A1 | 6/2014 | Li |
| 2014/0188804 A1 | 7/2014 | Gokhale |
| 2014/0258241 A1 | 9/2014 | Chen |
| 2015/0032694 A1 | 1/2015 | Rajamani et al. |
| 2015/0120659 A1 | 4/2015 | Srivastava |
| 2015/0134626 A1* | 5/2015 | Theimer .......... G06F 17/30289 707/693 |
| 2015/0254240 A1 | 9/2015 | Li et al. |
| 2016/0117779 A1* | 4/2016 | Sale .............. G06F 16/2365 705/4 |
| 2016/0170978 A1 | 6/2016 | Michael et al. |
| 2016/0352836 A1 | 12/2016 | Kamalakantha |
| 2017/0048314 A1 | 2/2017 | Aerdts et al. |
| 2017/0116207 A1 | 4/2017 | Lee |
| 2017/0116213 A1 | 4/2017 | Jain |
| 2021/0056123 A1 | 2/2021 | Lee |

OTHER PUBLICATIONS

U.S. Appl. No. 14/202,091, filed Mar. 10, 2014, Notice of Allowance, dated Feb. 26, 2016.

Michael, U.S. Appl. No. 14/571,008, filed Dec. 15, 2014, Office Action, dated Dec. 28, 2016.

Michael, U.S. Appl. No. 14/571,008, filed Dec. 15, 2014, Interview Summary, dated Mar. 17, 2017.

Rajeev Kumar et al., "Oracle DBA, A Helping Hand,"Container Database and Pluggable Database (CDB & PDB), retrieved from the internet on Dec. 4, 2013, 2 pages.

Preimesberger, Chris, "Oracle Profits Up, but Revenues Slip" Oracle, dated Sep. 20, 2012, 2 pages.

Oracle Base, Multitenant: Create and Configure a Pluggable Database (PDB) In Oracle Database 12c Release 1 (12.1), dated Jan. 8, 2014, 16 pages.

Muhammad Anwar, "How to Install Oracle 12c Multitenant Pluggable Database", Dated Feb. 24, 2012, 27 pages.

Michael et al., "Downtime-Free Live Migration in a Multitenant Database", Computer Science vol. 8904, dated Feb. 5, 2015, 25 pages.

Garcia-Molina et al., "Database System Implementation", dated Jan. 1, 2000, 84 pages.

Francisco Munoz et al., "Oracle Database 12c Backup and Recovery Survival Guide", dated Sep. 24, 2013, 8 pages.

Dominic Betts et al., "Developing Multi-Tenant Applications for the Cloud," 3rd Edition, Microsoft, 2012, 246 pages.

Das et al., "Albatross: Lightweight Elasticity in Shared Storage Databases for the Cloud Using Using Live Data Migration", Proceedings of the VLDB Endowment, vol. 4, No. 8 Copyright, dated 2011, 12 pages.

Anonymous: "Oracle-Base—Multitenant: Overview of Pluggable Databases (CDB) and Pluggable Databases (PDB)", dated Mar. 3, 2014, 4 pages.

Anonymous, :An Oracle White Paper Oracle Database Appliance: Migration Strategies, dated Jun. 2012, 14 pages.

Michael, U.S. Appl. No. 14/571,008, filed Dec. 15, 2014, Notice of Allowance, dated Sep. 12, 2018.

Lee, U.S. Appl. No. 15/215,446, filed Jul. 20, 2016, Restrcition Requirement, dated Oct. 1, 2018.

Lee, U.S. Appl. No. 15/215,446, filed Jul. 20, 2016, Office Action, dated Nov. 16, 2018.

Lee, U.S. Appl. No. 15/215,446, filed Jul. 20, 2019, Final Office Action, dated Dec. 4, 2019.

Jain, U.S. Appl. No. 15/093,506, filed Apr. 7, 2016, Final Office Action, dated Oct. 28, 2019.

Lee, U.S. Appl. No. 15/215,446, filed Jul. 20, 2016, Advisory Action, dated Jun. 4, 2019.

Jain, U.S. Appl. No. 15/093,506, filed Apr. 7, 2016, Interview Summary, dated Jul. 8, 2019.

Lee, U.S. Appl. No. 15/215,446, filed Jul. 20, 2016, Interview Summary, dated May 3, 2019.

Lee, U.S. Appl. No. 15/215,446, filed Jul. 20, 2016, Final Office Action, dated Mar. 12, 2019.

Jain, U.S. Appl. No. 15/093,506, filed Apr. 7, 2016, Office Action, dated Mar. 20, 2019.

Lee, U.S. Appl. No. 15/215,446, filed Jul. 20, 2016, Office Action, dated May 8, 2020.

Oracle Datebase 12c, White Paper "Database Live Migration with Oracle Multitenant and the Oracle Universal Connection Pool on Oracle Real Application Clusters (RAC)", dated Oct. 15, 2014, 13 pages.

Jain, U.S. Appl. No. 15/093,506, filed Apr. 7, 2016, Notice of Allowance, dated Jan. 6, 2020.

Lee, U.S. Appl. No. 15/215,446, filed Jul. 20, 2016, Notice of Allowance, dated Aug. 21, 2020.

Lee, U.S. Appl. No. 15/215,446, filed Jul. 20, 2020, Interview Summary, dated Aug. 11, 2020.

\* cited by examiner

THREAD GROUPS FOR PLUGGABLE DATABASE CONNECTION CONSOLIDATION IN NUMA ENVIRONMENT

CROSS-REFERENCE TO RELATED APPLICATIONS

This application is related to application Ser. No. 13/631,815, filed Sep. 28, 2012, titled "Container Database", the entire contents of which is hereby incorporated by reference as if fully set forth herein.

FIELD OF THE INVENTION

The present invention relates to managing connections for pluggable databases in a NUMA environment.

BACKGROUND

A database management system (DBMS) may manage a container database comprising multiple separate databases, referred to herein as pluggable databases. Although the pluggable databases contained in the same container database, each pluggable database is defined by its own separate database dictionary. The database dictionary comprises metadata that defines database objects contained in the database, such as database tables, table columns, and tablespaces. Hence, each pluggable database contains database objects that may be unrelated to database objects in the other pluggable databases.

The DBMS may comprise one or more database servers. The database servers may be hosted on one or more nodes of a non-uniform memory access (NUMA) environment. Non-uniform memory access refers to an architecture in which multiple central processing units (CPUs) have access to a pool of volatile memory, and each of the CPUs can access the rest of the volatile memory. NUMA multiprocessor systems allow clustering of CPUs into groups where each group is assigned a local memory. A process running on a particular NUMA node can access the local memory at a much lower latency than accessing memory assigned to another NUMA node ("remote memory").

In a NUMA environment, when the DBMS receives a request for a connection for a pluggable database, it may spawn a connection thread for the pluggable database at a particular NUMA node. Connection threads may be spawned at different NUMA nodes as requests are received, based on factors such as load balancing within the system. Thus, each NUMA node may be running threads for a number of different pluggable database, and numerous connections for any particular pluggable database may be distributed amongst various NUMA nodes.

Database systems commonly store data persistently on a disk. To speed up performance, some of the data may be cached in a "buffer cache" within volatile memory. Accessing the data from volatile memory is significantly faster than accessing the data from disk.

However, accessing data cached in memory assigned to another NUMA node is slower than accessing data cached in local memory. When connections for pluggable databases are spread across multiple NUMA nodes, a thread has a higher likelihood of requiring data that is cached in memory assigned to a different NUMA node. Even though the remote memory access is faster than retrieving data from the disk, it is inefficient to frequently access remote memory.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

To avoid the inefficiencies that occur when connections for pluggable databases are spread across nodes in a NUMA system, techniques are presented herein for assigning pluggable database connections to particular thread groups. When connections for pluggable databases are spread across multiple NUMA nodes, requested data might frequently be cached in local memory of another NUMA node. As remote memory accesses take longer than local memory accesses, the amount of time required by frequent remote memory accesses becomes significant.

In an embodiment, when a database server receives a request to connect to a pluggable database, the server determines a thread group associated with the requested pluggable database. Each thread group is assigned or otherwise associated with a process running in a NUMA node in the system. The server spawns a client thread in the associated process for the requested connection. Thus, threads for connecting to a particular pluggable database are grouped in the same process.

In an embodiment, a first process associated with the thread group cannot hold any additional threads. The database server selects a new process for associating with the thread group and spawning additional threads. The new process may be created in the same NUMA node as the first process, or in a NUMA node close to the same NUMA node.

System Overview

Figure 1:
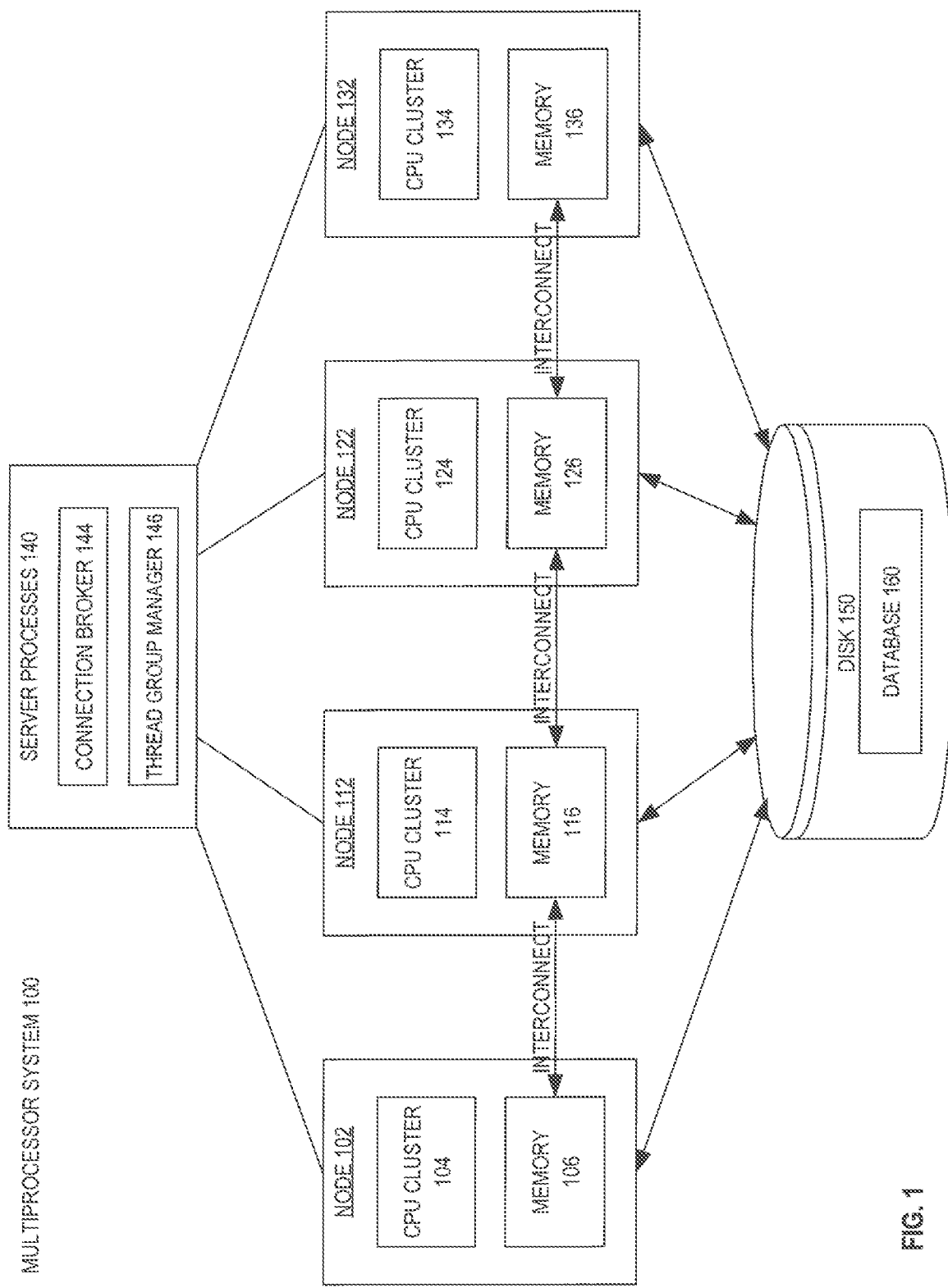
FIG. 1 is a block diagram illustrating a multiprocessor system with NUMA nodes.

FIG. 1 is a block diagram illustrating a multiprocessor system comprising NUMA nodes, according to one embodiment. Multiprocessor system 100 represents a single database compute node where a database instance is run. For example, multiprocessor system 100 may be a single instance symmetric processing compute node equipped with hundreds of processors. In the embodiment illustrated in FIG. 1, multiprocessor system 100 includes server processes 150 and NUMA nodes 102, 112, 122, and 132. The NUMA nodes have access to the same database 160.

Each NUMA node in multiprocessor system 100 comprises a cluster of processors that are assigned or otherwise associated with a memory. NUMA node 102, 112, 122, and 132 respectively include CPU cluster 104, 114, 124, and 134 and associated memory 106, 116, 126, and 136. A memory that is associated with a particular NUMA node is referred to as "local" with respect to the particular NUMA node and processes running on the particular NUMA node and "remote" with respect to other NUMA nodes and processes running on other NUMA nodes. For example, memory 106 is local memory for NUMA node 102 and remote memory for NUMA node 112, 122, and 132, and memory 136 is local memory for NUMA node 132 and remote memory for NUMA node 102, 112, and 122. Such location-based access priority typically results in inter-node memory accesses having higher latencies than intra-node memory accesses.

Each processor cluster may comprise one or more CPUs. The processor cluster for each NUMA node may be software or hardware based, depending on the particular implementation. In a software-based implementation, software is responsible for grouping processors and assigning each group to a local memory. In a hardware-based implementation, multiprocessor system 100 includes physically different system buses at each NUMA node location. Processors that belong to the same NUMA node share the same memory bus, which connects to a memory controller for accessing local memory. The memory bus at one NUMA node location is not shared with processors that do not belong to the NUMA node. Rather, the memory controller for the local memory is connected to memory controller for remote memories in other NUMA nodes via a separate high speed interconnect. When a processor accesses data that resides in a remote memory, the data is transferred over the high speed interconnect and not the system bus in the remote NUMA node.

Server processes 140 comprise processes associated with the database server, including connection broker 144 and thread group manager 146, as well as other components of a database management system. Server processes 140 may be executed on one or more of NUMA nodes 102, 112, 122, 132, on a separate NUMA node, or some combination thereof.

According to one embodiment, connection broker 144 is a database process that manages client connections to database 160. A client may request the connection broker to provide a connection for the database when it needs to perform a database activity. The connection broker may select a process running on a NUMA node for the client to use for its database activities. In a multi-threaded process, the connection broker may spawn a thread in the selected process for the client request. In the present example, if the connection broker 144 receives a request for a connection for database 160, connection broker 144 may select a process running on one of CPU cluster 104, 114, 124, or 134 and spawn a thread in the selected process.

According to one embodiment, the connection broker 144 uses the thread group manager 146 to select a process for spawning a client thread. The thread group manager may assign client threads that connect to the same pluggable database to the same group, referred to herein as a "thread group." A thread group may be assigned or otherwise associated with one or more processes running on a NUMA node. Threads that run in the same process and connect to the same pluggable database may share resources between one another. Thus, by assigning threads for a thread group to the same processes, memory consumption for the threads may be decreased.

When a request to connect to a pluggable database is received, the thread group manager determines which thread group the requested pluggable database is assigned to. The thread group manager spawns the client thread in a process associated with the thread group. Processes for handling a connection request and creating a client thread are further described in detail below.

Creating Buffer Splits

According to an embodiment, a portion of the volatile memory shared by NUMA nodes in a multiprocessor system is used as a cache for caching database objects in the database. A "cache" is a secondary storage that typically stores parts of a set of data that is stored in memory that is less efficient to access. For example, database objects in the database are primarily stored in backend storage on a disk. To read or modify a portion of an object, such as a data block, the portion of the database object is read into memory where it can be accessed or modified.

The portion of the volatile memory used as a cache may be split into segments and assigned to NUMA nodes in the multiprocessor system. Each NUMA node stores data blocks in the segment it is assigned to. In an embodiment, segments that are part of memory local to a NUMA node are assigned to that NUMA node.

Figure 2:
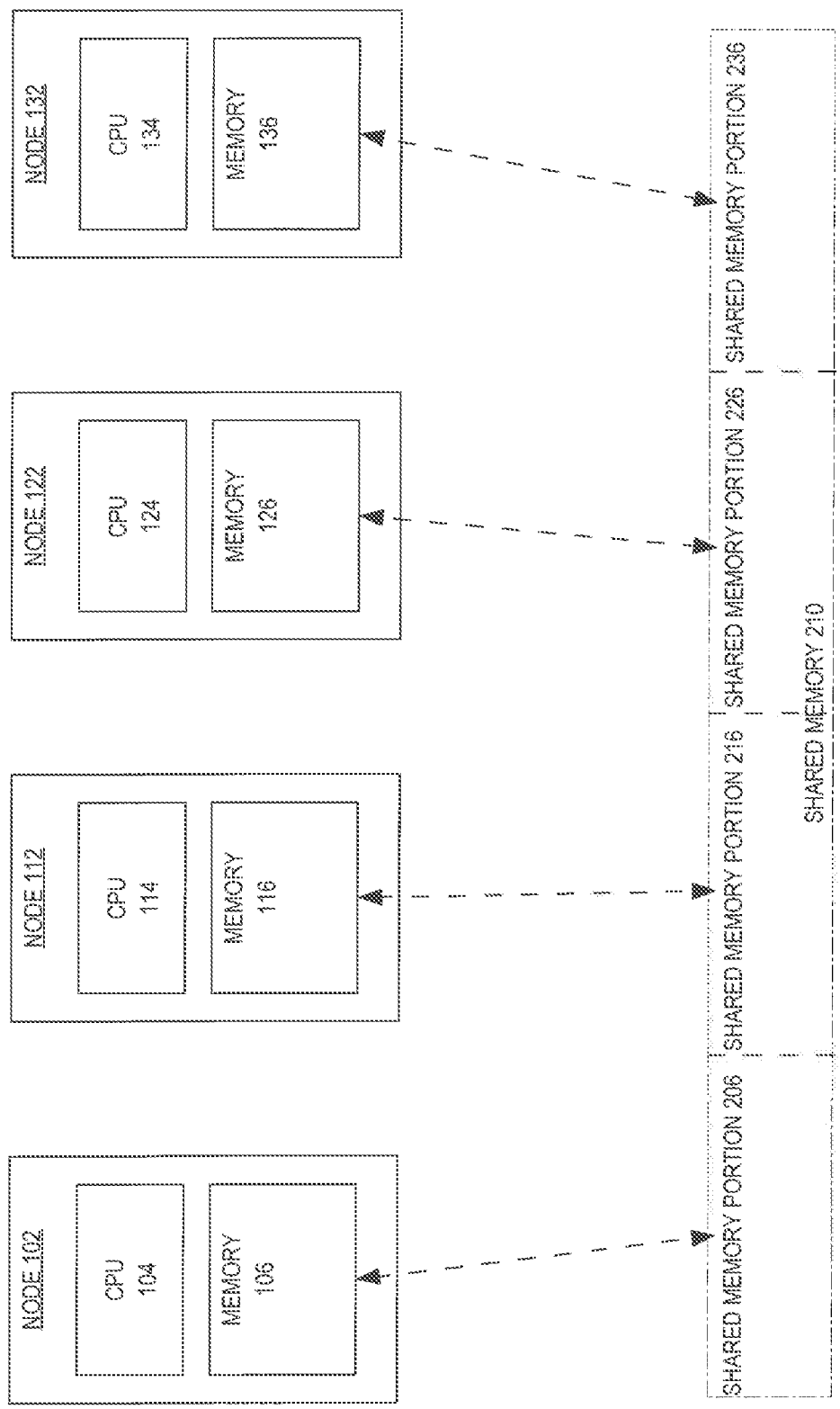
FIG. 2 is a block diagram illustrating the volatile memory shared between NUMA nodes.

Referring to FIG. 2, it depicts a shared memory for a multiprocessor system, in an embodiment. Shared memory 210 is distributed and maintained across NUMA nodes 102, 112, 122, and 132 in the multiprocessor system 100. In the present example, shared memory is split into shared memory portions 206, 216, 226, and 236. Each of shared memory portion 206, 216, 226, and 236 are respectively assigned to NUMA node 102, 112, 122, and 132. Some or all of each shared memory portion may be used as a cache for in-memory objects. A process on each NUMA node caches data blocks for a database in the assigned portion of the shared memory. For example, a thread running on CPU cluster 105 caches data blocks in shared memory portion 206.

Pluggable Databases

Figure 1B:
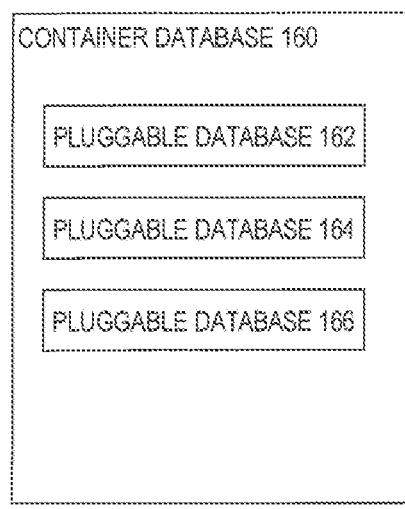
FIG. 1B is a block diagram illustrating a container database comprising pluggable databases.

Referring to FIG. 1B, it illustrates a detailed view of container database 160, in an embodiment. Database 160 is a container database comprising multiple pluggable databases 162, 164, and 168. Each pluggable database contains its own set of database objects. For the purpose of illustration, database 160 is shown stored on a single shared disk 150, but in alternative embodiments may be spread across multiple disks to which each of NUMA node 102, 112, 122, and 132 have access. Although database 160 is shown as comprising three pluggable databases, a container database may comprise any number of pluggable databases.

Each of pluggable databases 162, 164, and 168 may be accessed independently. In one embodiment, a user connected to a specific pluggable database is not exposed to the underlying structure utilized for database consolidation, and the specific pluggable database appears as an independent database system.

A database session comprises a particular connection established for a client to a database server instance through which the client may issue database requests. In order to serve a session with a particular pluggable database, a database server instance establishes a connection with the requested pluggable database.

Handling Client Connection Requests

Figure 3:
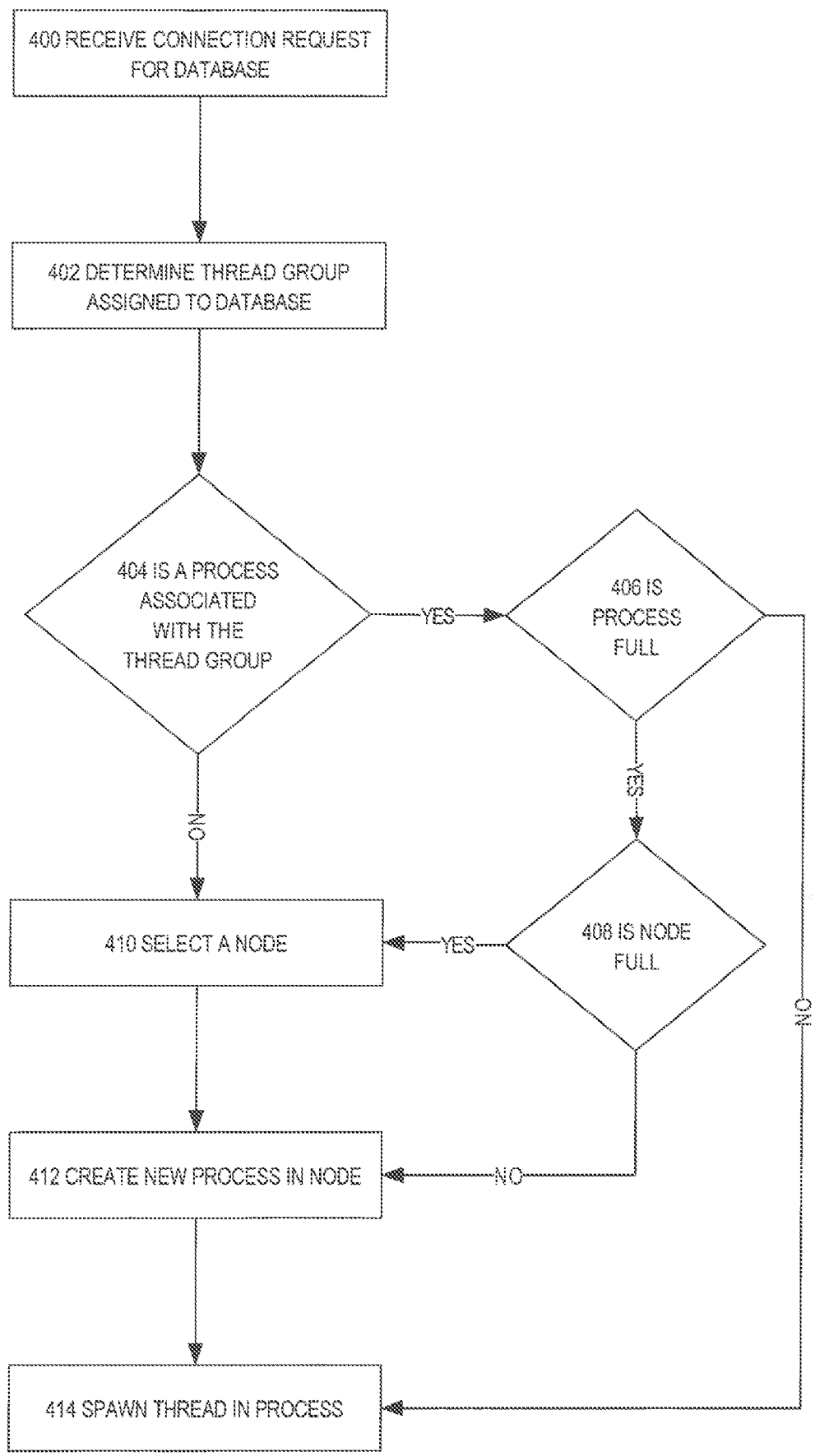
FIG. 3 is a flowchart illustrating steps for processing a connection request.

When a database server receives a request from a client for a connection for a pluggable database, the database server determines where to spawn a new client thread for establishing the connection. Referring to FIG. 3, it is a block diagram illustrating the steps performed by a database server to select a process on a NUMA node for satisfying a client request.

At step 300, the database server receives a request for a connection for a pluggable database. In an embodiment, the connection broker manages client requests. In the present example, connection broker 144 receives client connection requests to the database system and manages connections to pluggable databases 162, 164, and 166. For the purpose of illustration, assume connection broker 144 receives a request for a connection for pluggable database 162.

At step 302, the database server determines which thread group the requested pluggable database is assigned to. In an embodiment, the connection broker determines a thread group identifier associated with the requested pluggable database. The thread group identifier may be the name of the particular pluggable database, or some other unique identifier associated with each pluggable database. For the purpose of illustration, assume the thread group identifier for pluggable database 162 is "DB_162."

At step 304, the database server determines whether a process is associated with the thread group. The connection broker 144 sends the request to thread group manager 146 to select a process for spawning the client thread. In an embodiment, the connection broker 144 creates a request with the thread group identifier, to indicate which thread group to assign the connection to, and sends the request with the thread group identifier to the thread group manager 146. The thread group manager 146 uses the thread group identifier to determine which process is associated with the thread group. In an embodiment, the database server stores a mapping comprising thread group identifiers and one or more processes associated with the thread group identifier. In another embodiment, processes on a NUMA node are tagged with a thread group identifier. For the purpose of illustration, assume DB_162 is associated with a process on NUMA node 102.

If a process is associated with the thread group, then the thread group manager selects the process for spawning a new client thread. However, the selected process may be too full and a thread cannot be spawned in the selected process. A process is "full" if it is running the maximum number of threads and cannot hold any new threads. Similarly, a NUMA node may be "full" if a maximum number of processes are running in all CPUs in the processor cluster.

At step 306, the thread group manager checks if the process is full. If a process is associated with the thread group and can hold new threads, then the thread group manager selects the associated process and proceeds to step 314. However, if a process is associated with a thread group but is full, then the thread group manager has to select a different process for spawning the client thread, and the method proceeds to step 308.

At step 308, the thread group manager checks if it can create a new process in the same NUMA node. As processes in the same NUMA node cache data to the same local memory, it is preferable to have a thread group's processes run in the same NUMA node. If processors in the same NUMA node can run another process, then the thread group manager selects the same NUMA node to create a new process, and the method proceeds to step 312. However, if the same NUMA node is full, then the thread group manager cannot create a new process in the same NUMA node and must select a new NUMA node for creating a new process, and the method proceeds to step 310.

At step 310, if a process is not already associated with the thread group, or if both the process and the NUMA node running the process are full, then the thread group manager selects a new NUMA node. In an embodiment, the selection may be based on the distance between the new NUMA node and a NUMA node with processes already associated with the thread group, the load of the new NUMA load, preferences specified by a user of the database server, or any combination thereof.

If a first NUMA node is running processes already associated with the thread group, then data blocks are already cached in its shared memory portion for the requested pluggable database. Thus, it is preferable to select a second NUMA node that is close to the first NUMA node, in order to reduce the number of "hops" required to access the local memory of the first NUMA node. A "hop" is the number of connections a NUMA node must traverse in order to access remote memory. For example, referring again to FIG. 1, NUMA node 102 is one hop from NUMA node 112, two hops from NUMA node 122, and three hops from NUMA node 132. Thus, NUMA node 102 is closest to NUMA node 112 and furthest from NUMA node 132.

In the present example, assume the process associated with the thread group cannot hold any new threads. Thread group manager 146 attempts to create a new process in NUMA node 102. If NUMA node 102 cannot run any more processes, thread group manager 146 selects another NUMA node in multiprocessor system 100. For the purpose of illustration, assume NUMA node 112 is not running any processes. Since NUMA node 112 is closest to NUMA node 102, thread group manager selects NUMA node 112 as the next NUMA node for processes assigned to the thread group.

At step 312, the thread group manager creates a new process in the selected NUMA node. In an embodiment, the thread group manager tags the new process with the thread group identifier. In another embodiment, the thread group manager updates a mapping to indicate the new process is assigned to the particular thread group.

At step 314, the thread group manager spawns a new client thread in the selected process.

DBMS Overview

A DBMS manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMS's, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database, as well as other kinds of operations. A database command may be in the form of a database statement that conforms to a database language. A database language for expressing the database commands is the Structured Query Language (SQL). There are many different versions of SQL, some versions are standard and some proprietary, and there are a variety of extensions. Data definition language commands are issued to a database server to create or configure database objects, such as tables, views, or complex data types. DDL commands are used to configure a database server for a particular hardware environment, to configure computer resource usage of the database server, as well as other operating aspects of the database server.

A multi-node database management system is made up of interconnected nodes that share access to the same database or databases. Typically, the nodes are database server hosts interconnected via a network and share access, in varying degrees, to shared storage, e.g. shared access to a set of disk drives and data blocks stored thereon. Each node in a multi-node database system hosts a database server. A server, such as a database server, is a combination of software and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to as a "server instance" or "instance". A database server may comprise multiple database instances, some or all of which are running on separate computers, including separate server blades.

The term process refers to a computer system process, which is described below in the HARDWARE OVERVIEW. Processes that comprise a database server run under the control of the database server (i.e. can be created or terminated by the database server) and perform various database server functions. Such processes are referred to herein as database server processes. Database server processors include listeners, garbage collectors, log writers, "server processes" for database sessions for executing database commands issued by database clients (including processes executing within shared sessions), and recovery processes.

Data Blocks

A data block is a unit of persistent storage and is used by a database server to store one or row more database rows, or portions of rows, including one or more columns of a row. When rows are read from persistent storage, a data block containing the row is copied into a data block buffer in volatile and/or main memory of a database server. A data block usually contains multiple rows, and data block metadata describing the contents of the data block. Metadata includes control and formatting information, such as offsets to sequences of bytes representing rows or other data structures, and a list of transactions affecting a row.

A data block is referred to as being atomic because, at least in part, a data block is the smallest unit of database data a database server may request from a persistent storage device. For example, when a database server seeks a row that is stored in a data block, the data block may only read the row from a persistent storage device by reading in the entire data block.

A data block is associated with a data block address that uniquely identifies the data block and the data block's storage location within a storage device. A database server may request from a storage device a data block by data block address, or even by primary block address ranges of data blocks.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
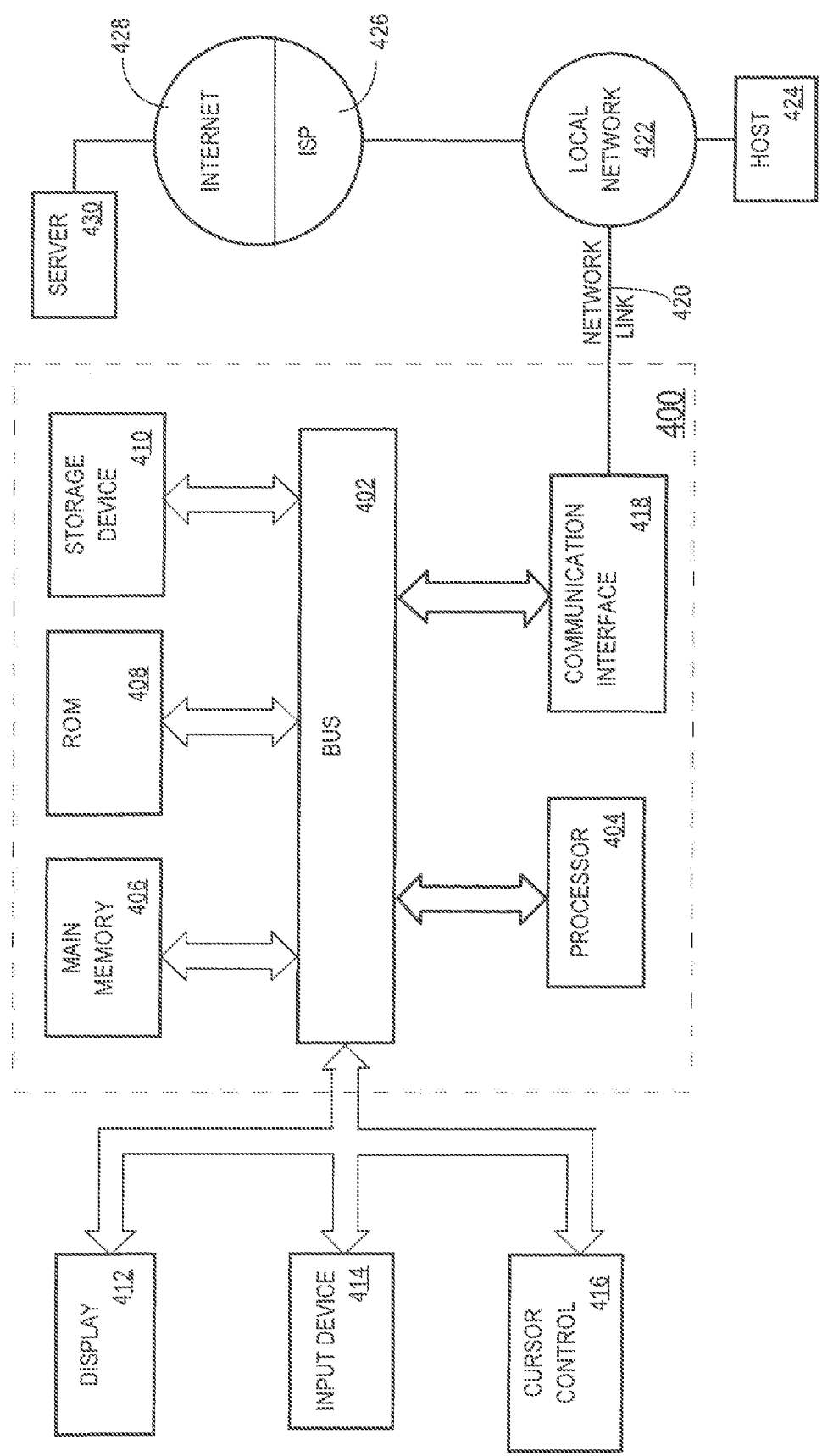
FIG. 4 is a block diagram illustrating a computer system that may be used to implement the techniques described herein.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. A computer system process comprises an allotment of processor time, and an allotment of memory (physical and/or virtual), the allotment of memory being for storing instructions executed by the processor, for storing data generated by the processor executing the instructions, and/or for storing the processor state (e.g. content of registers) between allotments of the processor time when the computer system process is not running. Computer system processes run under the control of an operating system, and may run under the control of other programs being executed on the computer system. A computer system process may divide execution of a set of instructions into one or more process threads. Process threads running within the same computer system process may run concurrently and may share resources such as the allotment of memory for the computer system process.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   a database management system that manages a plurality of databases running on a multi-node system, said multi-node system comprising multiple nodes, each node of said multiple nodes being interconnected to a respective local memory that cannot be directly accessed by another node of said multiple nodes;
   said database management system storing data associating a first process with a particular database of the plurality of databases;
   one or more first threads running within said first process on a particular node, said one or more first threads establishing a connection for one or more clients and the particular database;
   while said one or more first threads are running within the first process:
      receiving multiple requests to establish a new connection for a particular client and the particular database in the plurality of databases through which the particular client will issue database statements against the particular database;
      for each request of said multiple requests:
         identifying the first process as a process in which to create a thread for said each request to establish a connection to the particular database based on the data associating the first process with said particular database;
         in response to identifying the first process, creating a respective second thread in the first process for said each request to establish a connection to the particular database; and said respective second thread for said each request storing data blocks from said particular database in the respective local memory of said particular node.

2. The method of claim 1:
receiving a request for a connection for a second particular database in the plurality of databases;
wherein no process is associated with said second particular database;
selecting a second particular node to create a new process to associate with the second particular database;
creating a new process on the second particular node to associate with the second particular database; and
creating a thread in the new process to connect to the second particular database.

3. The method of claim 2, wherein selecting the second particular node is based, in part, on the load of the second particular node.

4. The method of claim 1:
wherein the first process associated with the particular database is full;
creating a new process on the particular node to associate with the particular database; and
creating a thread in the new process to connect to the particular database.

5. The method of claim 1:
wherein the first process associated with the particular database is full, and the particular node is full;
selecting a new node to create a process to associate with the particular database;
creating a new process on the particular node to associate with the particular database;
creating a thread in the new process to connect to the particular database.

6. The method of claim 5, wherein selecting the new node is based, in part, on the proximity of the new node to the particular node.

7. The method of claim 1, further comprising:
creating a shared memory accessible by the multiple nodes of the multi-node system, wherein the shared memory comprises one or more portions of the respective local memory.

8. The method of claim 7 further comprising:
receiving a request for data blocks from the particular database, wherein the data is stored in the local memory of a remote node;
accessing the local memory of the remote node using the shared memory.

9. One or more non-transitory computer-readable media storing instructions, the instructions, which when executed by one or more hardware processors, cause:
a database management system that manages a plurality of databases running on a multi-node system, said multi-node system comprising multiple nodes, each node of said multiple nodes being interconnected to a respective local memory that cannot be directly accessed by another node of said multiple nodes;
said database management system storing data associating a first process with a particular database of the plurality of databases;
one or more first threads running within said first process on a particular node, said one or more first threads establishing a connection for one or more clients and the particular database;
while one or more multiple first threads are running within the first process:
receiving multiple requests to establish a new connection for a client and the particular database in the plurality of databases through which the client will issue database statements against the particular database;
for each request of said multiple requests:
identifying the first process as a process in which to create a thread for said each request to establish a connection to the particular database based on the data associating the first process with said particular database;
in response to identifying said first process, creating a respective second thread in the process running on the particular node for said each request to establish a connection to the particular database; and
said respective second thread for said each request storing data blocks from said particular database in the respective local memory of said particular node.

10. The one or more non-transitory computer-readable media of claim 9, the instructions further including:
instructions which, when executed by one or more hardware processors, cause receiving a request for a connection for a second particular database in the plurality of databases;
wherein no process is associated with said second particular database;
instructions which, when executed by one or more hardware processors, cause selecting a second particular node to create a new process to associate with the second particular database;
instructions which, when executed by one or more hardware processors, cause creating a new process on the second particular node to associate with the second particular database; and
instructions which, when executed by one or more hardware processors, cause creating a thread in the new process to connect to the second particular database.

11. The one or more non-transitory computer-readable media of claim 10, wherein selecting the second particular node is based, in part, on the load of the second particular node.

12. The one or more non-transitory computer-readable media of claim 9, wherein the first process associated with the particular database is full, the instructions further including:
instructions, which when executed by one or more hardware processors, cause creating a new process on the particular node to associate with the particular database; and
instructions, which when executed by one or more hardware processors, cause creating a thread in the new process to connect to the particular database.

13. The one or more non-transitory computer-readable media of claim 9, wherein first the process associated with the particular database is full, and the particular node is full, the instructions further including:
instructions, which when executed by one or more hardware processors, cause selecting a new node to create a process to associate with the particular database;
instructions, which when executed by one or more hardware processors, cause creating a new process on the particular node to associate with the particular database;

instructions, which when executed by one or more hardware processors, cause creating a thread in the new process to connect to the particular database.

14. The one or more non-transitory computer-readable media of claim 13, wherein selecting the new node is based, in part, on the proximity of the new node to the particular node.

15. The one or more non-transitory computer-readable media of claim 9, the instructions further including:
   instructions, which when executed by one or more hardware processors, cause creating a shared memory accessible by the multiple nodes of the multi-node system, wherein the shared memory comprises one or more portions of the respective local memory.

16. The one or more non-transitory computer-readable media of claim 15, the instructions further including:
   instructions, which when executed by one or more hardware processors, cause receiving a request for data blocks from the particular database, wherein the data is stored in the local memory of a remote node;
   instructions, which when executed by one or more hardware processors, cause accessing the local memory of the remote node using the shared memory.

* * * * *